United States Patent Office 3,541,051
Patented Nov. 17, 1970

3,541,051
SULFONAMIDE-SUBSTITUTED
BENZYLANILINES
Fumio Hirata, Suita, Tadao Tanouchi, Takatsuki, and Yasumichi Kajita, Nishinomiya, Japan, assignors to Ono Pharmaceutical Co., Ltd., Osaka, Japan
No Drawing. Filed Feb. 27, 1968, Ser. No. 708,512
Claims priority, application Japan, Mar. 6, 1967, 42/14,312
Int. Cl. C07c 143/80
U.S. Cl. 260—397.7     4 Claims

ABSTRACT OF THE DISCLOSURE

Sulfonamide-substituted benzylanilines, such as 2,4'-disulfonamidebenzylaniline, 4,4' - disulfonamidebenzylaniline, and 2,4,4'-trisulfonamidebenzylamine, are useful as anticonvulsant or antiepileptic agents. A method for the preparation thereof is also disclosed.

---

This invention relates to novel sulfonamide-substituted benzylanilines and production thereof.

More particularly the sulfonamide-substituted benzylanilines of the present invention are represented by the general formula:

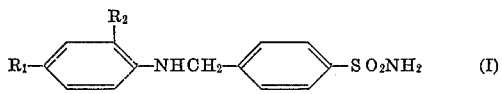

wherein each of $R_1$ and $R_2$ is hydrogen or $-SO_2NH_2$ and at least one of $R_1$ and $R_2$ must be $-SO_2NH_2$.

According to the present invention the compounds of the Formula I are prepared by condensing a sulfonamideaniline of the formula:

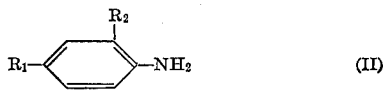

wherein $R_1$ and $R_2$ are as defined before, with 4-sulfonamidebenzaldehyde of the formula:

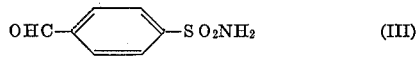

to form the corresponding Schiff base of the formula:

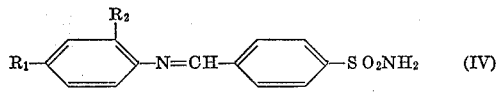

and then reducing the Schiff base.

Among the compounds represented by the Formula II are 2-monosulfonamideaniline, 4-monosulfonamideaniline and 2,4-disulfonamideaniline. Correspondingly, the resulting compounds of the Formula I are 2,4'-disulfonamidebenzylaniline, 4,4'-disulfonamidebenzylaniline and 2,4,4'-trisulfonamidebenzylaniline.

In carrying out the process of this invention, the condensation of the compound of the sulfonamideaniline and 4-sulfonamidebenzaldehyde are heated together in an organic medium such as an alcohol, dioxane, ether, etc. Any elevated temperature up to the boiling point of the particular solvent may be used, although it is preferable to reflux the reaction mixture. The reactants may be used in substantially equimolar proportions, although one may be in slightly molar excess to the other.

The resulting Schiff base (corresponding sulfonamidebenzylideneaniline) is then reduced to the corresponding sulfonamidebenzylaniline of the Formula I. This reduction may be conducted in a proper solvent such as an alcohol, dioxane, ether, etc. The reduction may be carried out in a usual manner well known in the art of reduction of organic compounds, e.g. catalytic reduction or the use of a reducing agent. For example, the Schiff base is hydrogenated at room temperature under atmospheric pressure in a proper organic solvent in the presence of a catalytically reducing catalyst in ordinary use such as palladium, nickel, platinum or iron. The Schiff base may also be reduced with sodium amalgam or aluminum amalgam in an aqueous solution of an alkali. Alternatively, the Schiff base may be reduced with various complex metal hydrides such as aluminum lithium hydride, boron sodium hydride, etc. in such solvent as ether, dioxane, tetrahydrofurane, alcohol or glacial acetic acid.

After the reducing reaction the product can be isolated or recovered in a usual manner. For example, the catalyst is separated and the filtrate is concentrated to crystallize out the product.

The compounds of this invention have carbonic anhydrase inhibiting activity and are particularly excellent in carbonic anhydrase inhibitory activity in the brain. They are low in toxicity. Therefore, the compounds of the invention are useful as anticonvulsant or antiepiletic agent (against grand mal, petit mal, psychomotor attacks). For example, when 4,4'-disulfonaminobenzylaniline was intraperitoneally administered in a rat in an amount of $2.5 \times 10^{-4}$ mol/kg. body weight, the carbonic anhydrase inhibitory effect in the brain was high (53%) as compared with 35% which is shown by acetazolamide. Such high anticonvulsant effect could reduce 58% of the duration of the maximum electroshock seizures. Further, the lethal doses in mice and rats were more than 10 g./kg. body weight by oral administration and accordingly there was little toxicity.

For administration of these compounds of the invention as anticonvulsant or antiepileptic agent for human, the agent may be administered orally. Usually, daily dosage is 0.25–1 g. in 2 or 3 divided doses.

The present invention will be explained concretely by referring to the following examples.

EXAMPLE 1

Synthesis of 4,4'-disulfonamidobenzylaniline 6.1 g. of 4-sulfonamidobenzaldehyde and 5.7 g. of sulfamine were suspended in 100 ml. of methanol. The suspension was stirred and refluxed for 2 hours. Then the reaction mixture was cooled to form crystals, which were separated by filtration. The write crystals of a melting point of 245° C. were 4,4'-disulfonamidobenzylideneaniline. The yield was 10.2 g. (91.1% of theoretical). The elemental analysis for $C_{13}H_{13}N_3S_2O_4$ was as follows:

Calculated (percent): C, 46.02; H, 3.83; N, 12.39.
Found (percent): C, 46.08; H, 3.70; N, 12.50.

Then 4 g. of 4,4'-disulfonamidobenzylideneaniline were dissolved in 400 ml. of methanol, 2 g. of a Raney nickel catalyst were added to the solution and hydrogen was passed through the solution at the room temperature under the atmospheric pressure for 2 hours. After the completion of the reaction, the catalyst was separated and the filtrate was concentrated to ⅕ the volume. There were obtained crystals of 4,4'-disulfonamidobenzylaniline of a melting point of 214 to 217° C. The yield was 3.5 g. (87.1% of theoretical).

EXAMPLE 2

The procedure of Example 1 was repeated except that 2-sulfonamideaniline was employed in place of sulfamine. There was obtained 2,4'-disulfonamidebenzylaniline.

EXAMPLE 3

Synthesis of 2,4,4'-trisulfonamidobenzylaniline 5 g. of 4-sulfonamidobenzaldehyde and 6.8 g. of 2,4-disulfonamideaniline were suspended in 100 ml. of methanol. The suspension was stirred and refluxed for 1 hour. The mixture was cooled to form crystals which were separated by filtration. The white crystals of a melting point of 256 to 258° C. were 2,4,4'-trisulfonamidobenzylideneaniline. The yield was 9.8 g. (86.7% of theoretical). The elemental analysis for $C_{13}H_{14}N_4S_3O_6$ was as follows:

Calculated (percent): C, 37.31; H, 3.37; N, 13.39.
Found (percent): C, 37.20; H, 3.23; N, 13.20.

Then 5 g. of 2,4,4'-trisulfon amidobenzylideneaniline were dissolved in 250 ml. of methanol, 2 g. of a Raney nickel catalyst were added to the solution and hydrogen was passed through the solution at the room temperature under the atmospheric pressure for 2 hours. After the completion of the reaction, the catalyst was separated and the filtrate was concentrated to ⅕ the volume. There were formed crystals of 2,4,4'-trisulfonamidobenzylaniline. The yield was 4.3 g. (85.7% of theoretical). The element analysis for $C_{13}H_{16}N_4S_3O_6$ was as follows:

Calculated (percent): C, 37.14; H, 3.40; N, 13.33.
Found (percent): C, 36.94; H, 3.61; N, 13.51.

What we claim is:

1. A sulfonamide-substituted benzylaniline of the formula:

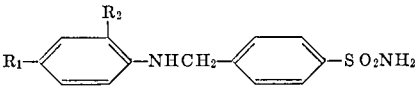

wherein each of $R_1$ and $R_2$ is selected from hydrogen and $-SO_2NH_2$, but at least one of $R_1$ and $R_2$ is $-SO_2NH_2$.

2. 2,4'-disulfonamidebenzylaniline.
3. 4,4'-disulfonamidebenzylaniline.
4. 2,4,4'-trisulfonamidebenzylaniline.

References Cited

UNITED STATES PATENTS

| | | | |
|---|---|---|---|
| 1,915,334 | 6/1933 | Salzberg et al. | 260—243 |
| 2,075,359 | 3/1937 | Salzberg et al. | 424—250 |
| 2,111,768 | 3/1939 | Goissedet et al. | 260—397.7 |

OTHER REFERENCES

Systematic Identification of Organic Compounds, Shriner et al., 3rd ed. 1948, pp. 152, 214, 216.

HENRY R. JILES, Primary Examiner

S. D. WINTERS, Assistant Examiner

U.S. Cl. X.R.

260—556; 424—228, 321